United States Patent [19]

Radhakrishnan et al.

[11] Patent Number: 4,720,784
[45] Date of Patent: Jan. 19, 1988

[54] MULTICOMPUTER NETWORK

[76] Inventors: Thiruvengadam Radhakrishnan, 1105 Parnasse, Brossard, Quebec, Canada, J4W 2C5; Clifford P. Grossner, 1422 Page St., Chomeday, Laval, Quebec, Canada, H7W 3S4

[21] Appl. No.: 543,065

[22] Filed: Oct. 18, 1983

[51] Int. Cl.⁴ ............................................. G06F 15/16
[52] U.S. Cl. ................................................... 364/200
[58] Field of Search ... 364/200 MS File, 900 MS File

[56] References Cited

U.S. PATENT DOCUMENTS

| | | |
|---|---|---|
| 3,413,613 | 11/1968 | Bahrs et al. . |
| 3,634,830 | 1/1972 | Baskin . |
| 3,641,505 | 11/1972 | Artz et al. . |
| 3,753,234 | 8/1973 | Gilbert et al. . |
| 3,787,673 | 1/1974 | Watson et al. . |
| 3,787,816 | 1/1974 | Hauck et al. . |
| 3,875,391 | 4/1975 | Shapiro et al. . |
| 4,058,711 | 11/1977 | Ondercin et al. . |
| 4,070,704 | 1/1978 | Calle et al. . |
| 4,085,448 | 4/1978 | Kogge . |
| 4,123,794 | 10/1978 | Matsumoto . |
| 4,131,941 | 12/1978 | Siegel et al. . |
| 4,177,514 | 12/1979 | Rupp . |
| 4,199,811 | 4/1980 | Borgerson et al. . |
| 4,247,892 | 1/1981 | Lawrence . |
| 4,251,861 | 2/1981 | Mago . |
| 4,380,052 | 4/1983 | Shima .................................... 364/900 |
| 4,453,211 | 6/1984 | Askinazi et al. .................... 364/200 |

*Primary Examiner*—Gary V. Harkcom
*Assistant Examiner*—C. H. Lynt
*Attorney, Agent, or Firm*—Schwartz, Jeffery, Schwaab, Mack, Blumenthal & Evans

[57] ABSTRACT

A multicomputer network that includes a plurality of individual computers and an interconnection system for interconnecting the computers. An interface is provided for connecting the computers to the network interconnection system which includes a bus controller and a bus.

13 Claims, 11 Drawing Figures

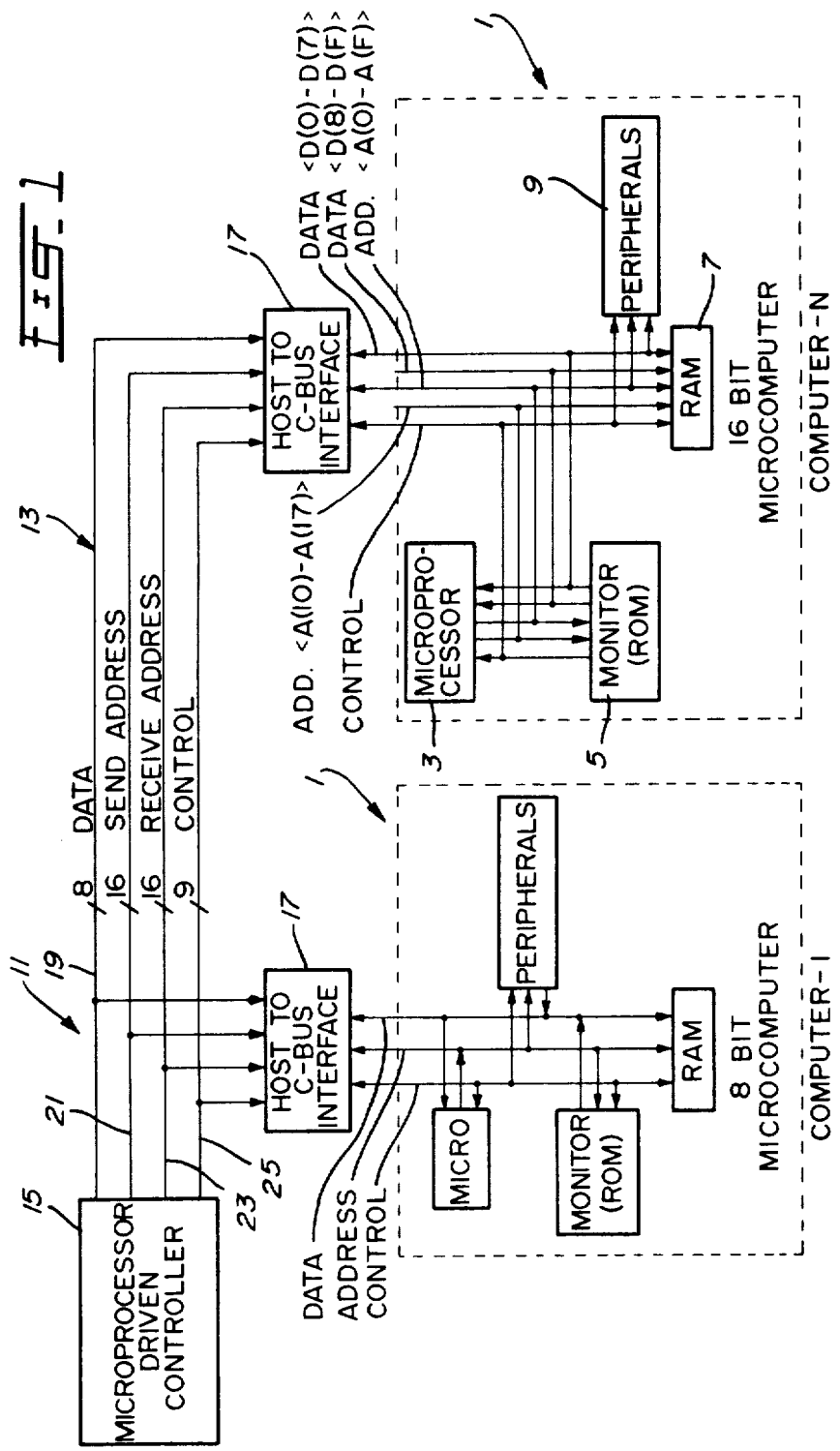

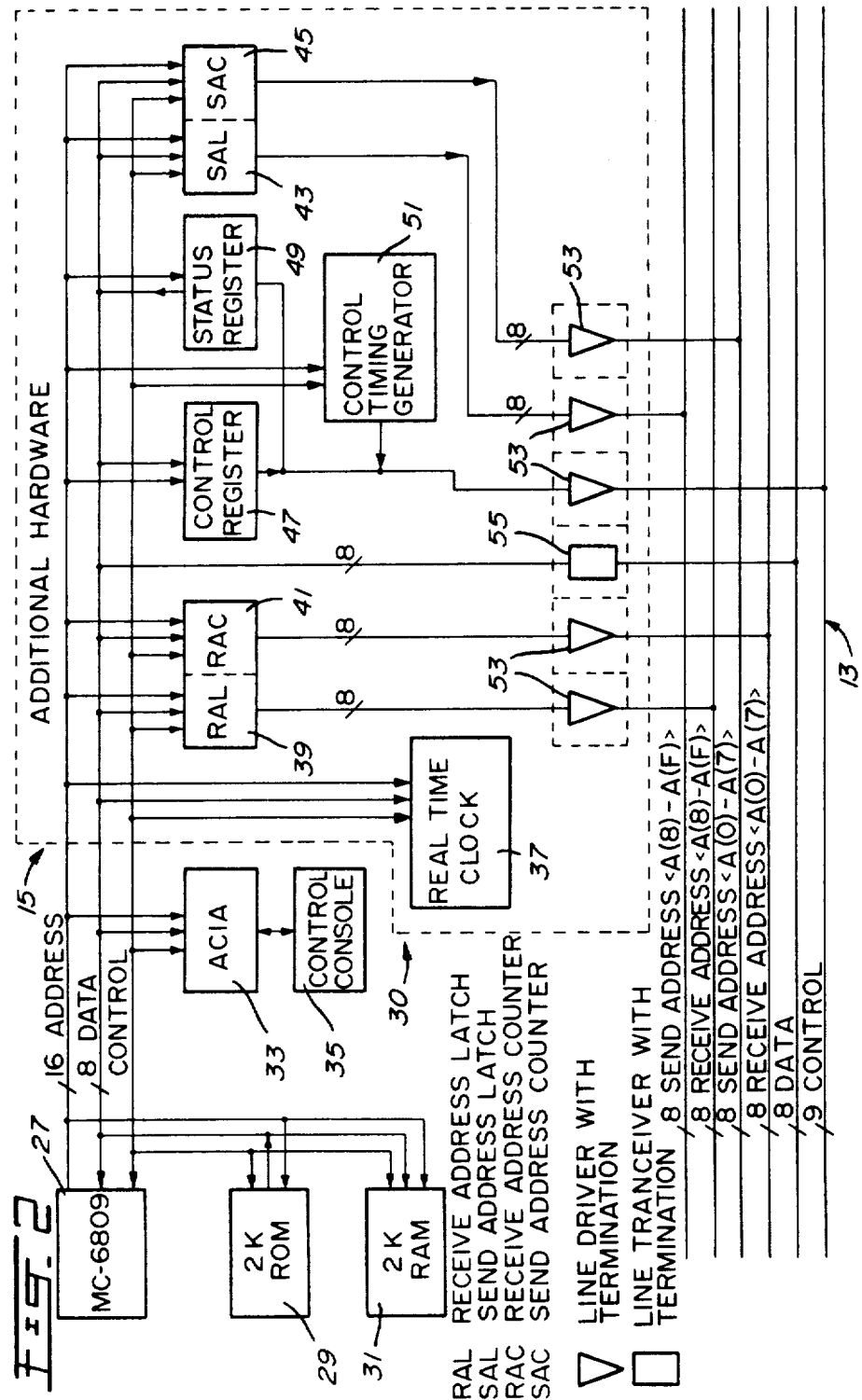

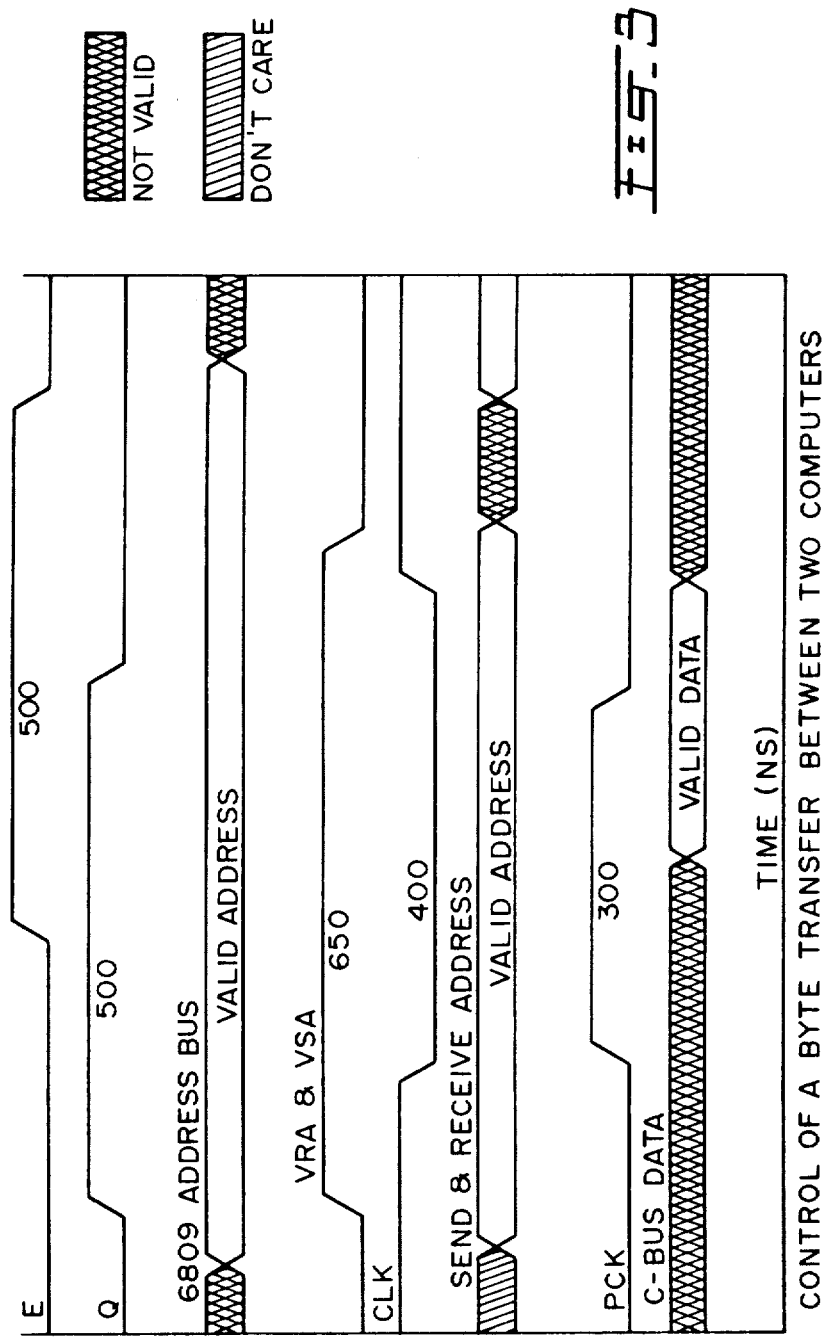

CONTROLLER FUNCTIONS

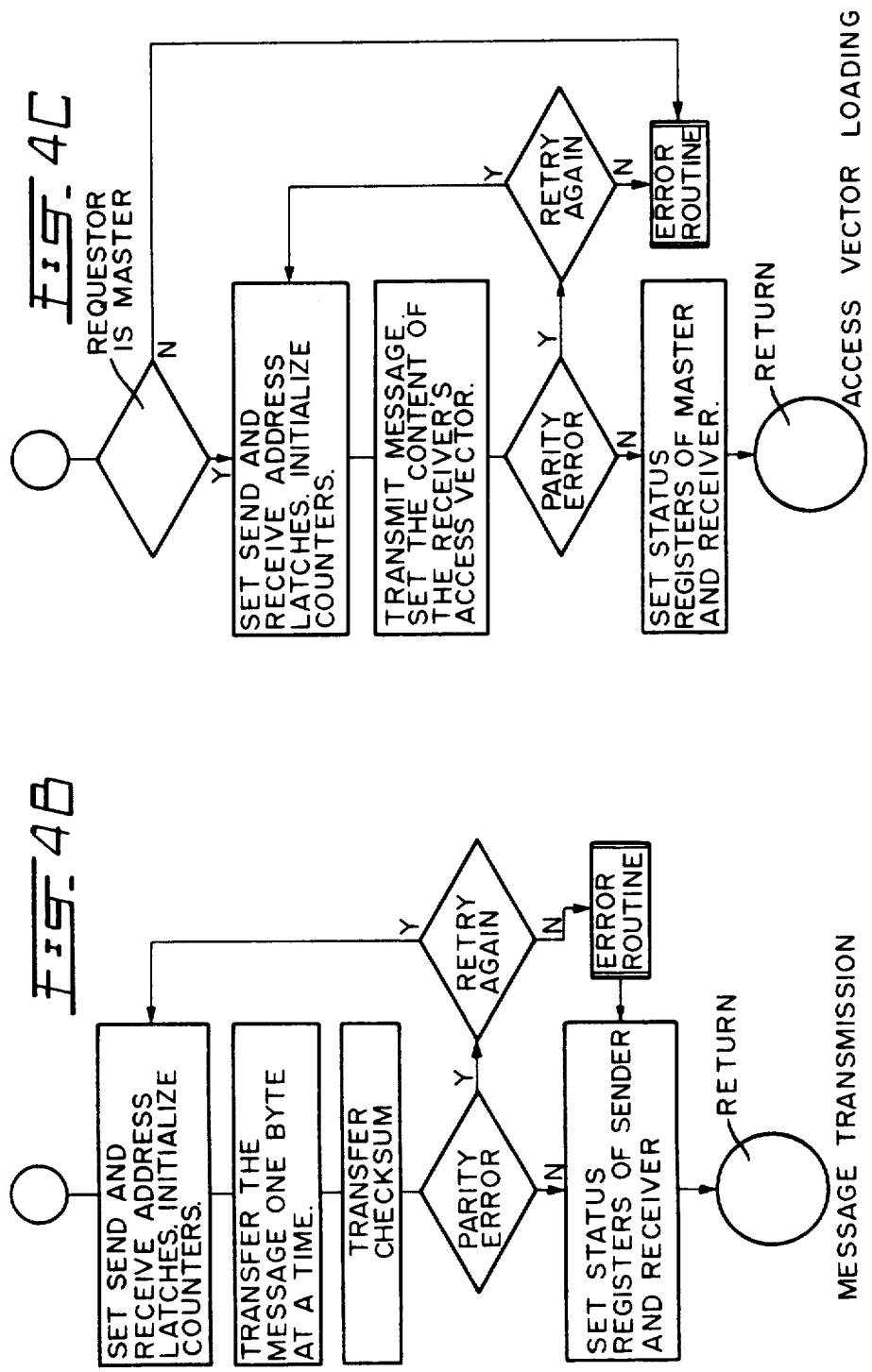

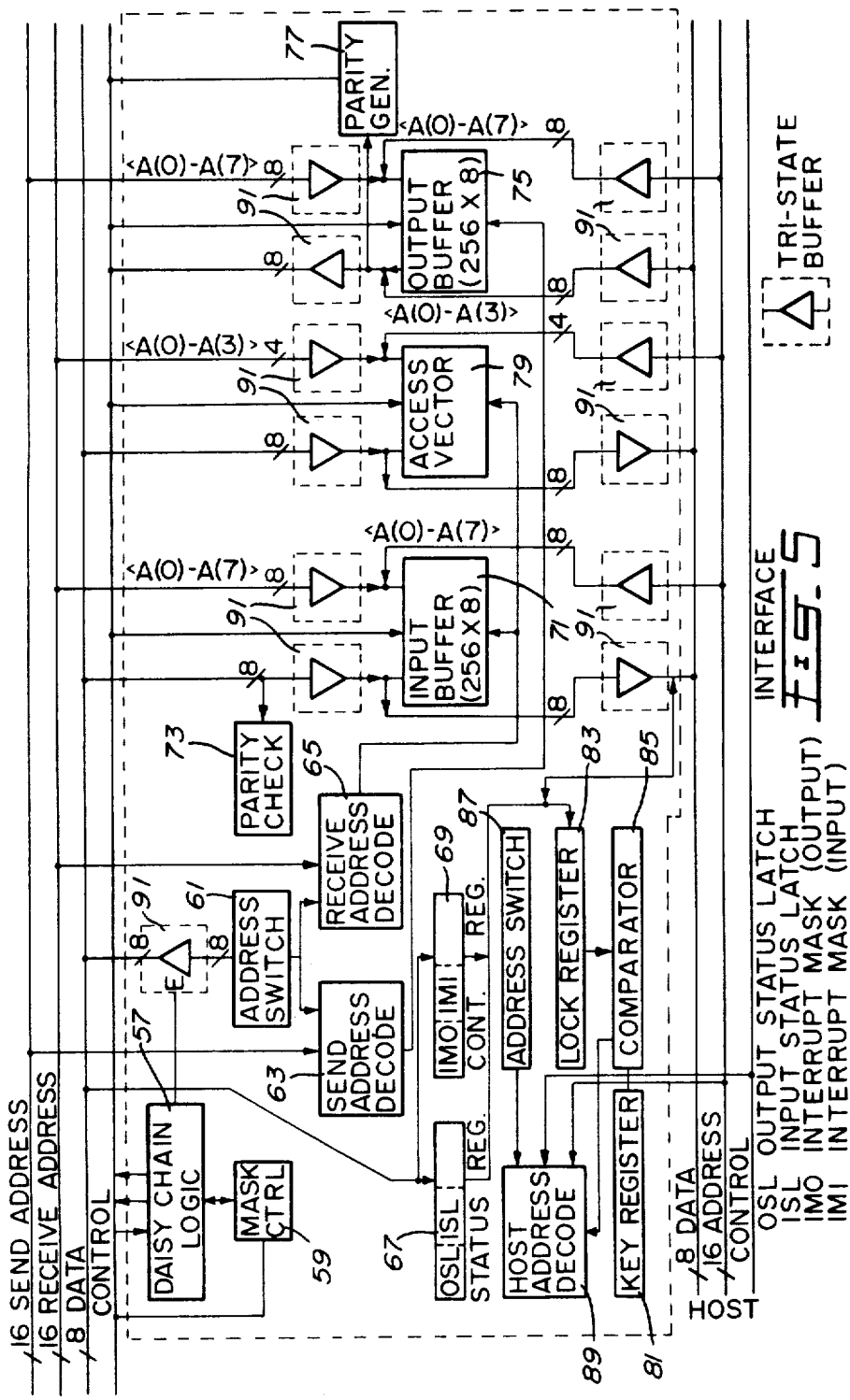

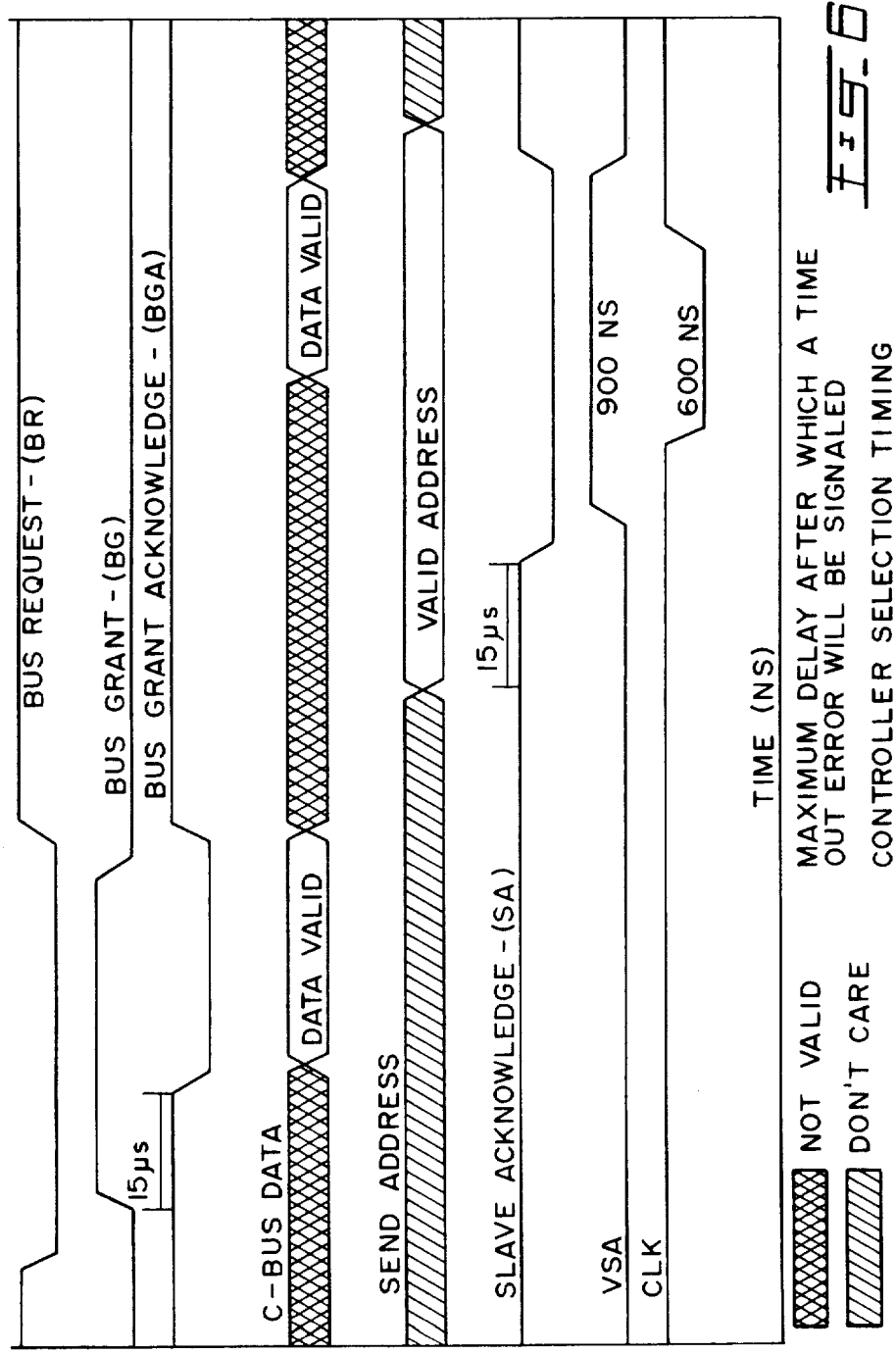

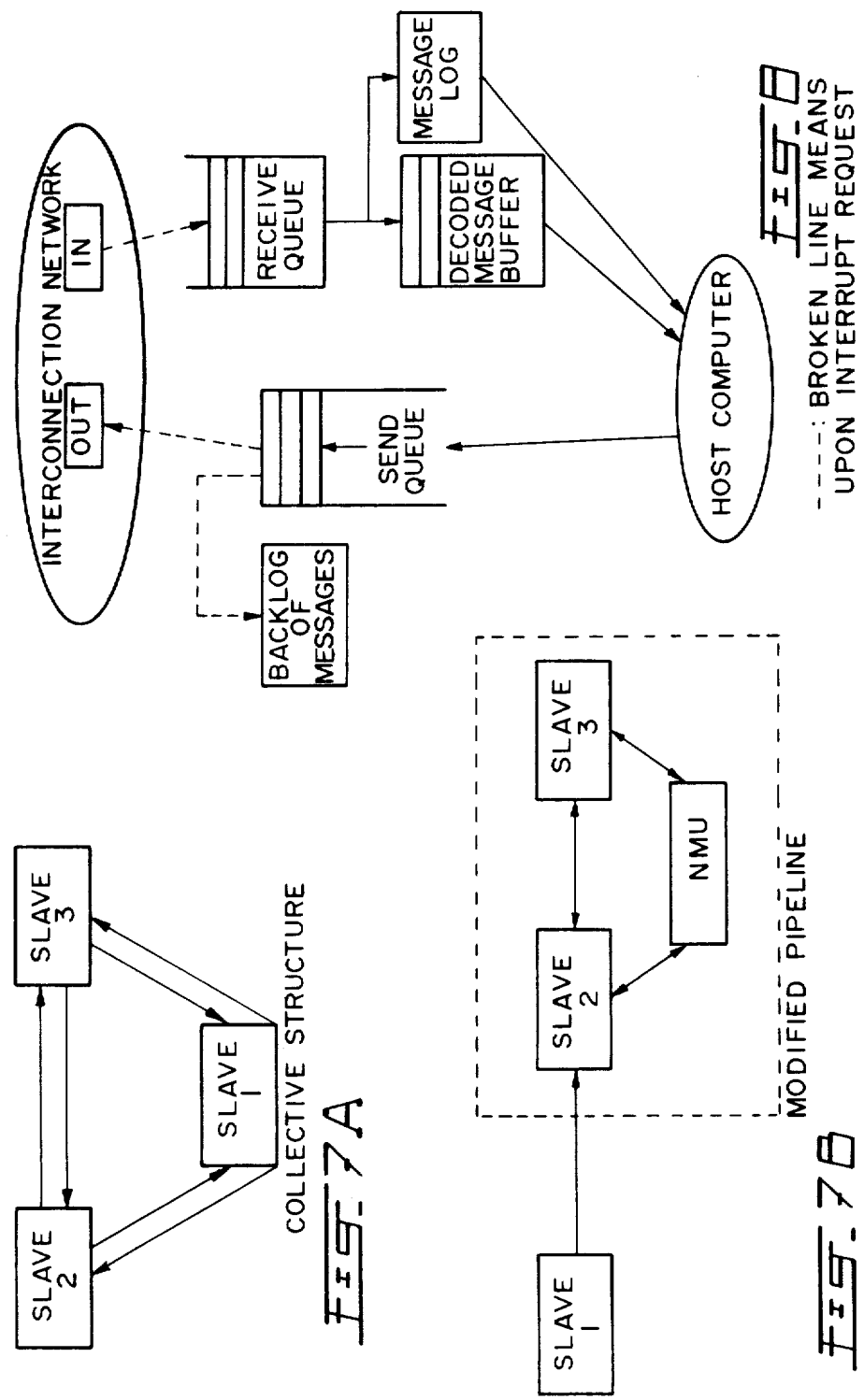

MULTICOMPUTER NETWORK

BACKGROUND OF INVENTION (a) Field of the Invention

The invention relates to a multicomputer network which includes a novel interconnection system for interconnecting the computers of the network, as well as an interface means for connecting the computers of the multicomputer network to the interconnection system.

The invention also relates to the novel interconnection system comprising a time shared high speed parallel bus and a controller therefore.

The invention also relates to the novel interface means.

(b) Statement of the Problem

Many factors, including increasing demand for computing power and memory capacity coupled with decreasing costs of microcomputers, have contributed to the growth of research and application in the area of multiple microcomputer systems. One of the uses of such multiple microcomputer systems is distributed computing wherein a complex algorithm is decomposed into several modules. Some, or all, of the modules are then executed simultaneously on different computers of the multicomputer system.

Any algorithm can be decomposed in different ways, and each different decomposition may require a different intercomputer communication pattern for the multicomputer system. Thus, the computers may be connected to each other with communications in one direction only. Or they could be connected to each other with communications in both directions. Or a tree pattern could be formed.

The problem of finding the optimal decomposition for any algorithm, that is, the one which minimizes the overall run time, is still an open research problem (see for example, P. H. Enslow, "Multiprocessor Organization, A Survey", Computing Surveys, Vol. 9, No. 1, 1977, pp. 103-129).

Thus, in order to test for the optimality of different decompositions, it would be desirable to have a flexible arrangement wherein the communication patterns of the computers in a multicomputer network can be easily and quickly rearranged. With such a flexible network, different decompositions can be experimentally studied and evaluated.

For such an arrangement, the interconnection systems are critical. Such interconnection systems have been the subject of study at universities, for example, Cm* at Carnegie-Mellon University (R. J. Swan, S. H. Fuller, and D. P. Siewiorek, "Cm*, A Modular Multimicroprocessor", Proc. AFIPS Nat. Comp. Conf., 1977, pp. 637–644), the MICRONET project at the State University of New York at Buffalo (L. D. Wittie, "MICRONET: A Reconfigurable Microcomputer Network for Distributed Systems Research", Simulation, Sept. 1978), and the $\mu^*$ project at Politecnico di Torino (P. Civera, G. Conte, D. Del Corso, F. Gregoretti, and E. Pasero, "The $\mu^*$ Project: An Experience with a Multimicroprocessor System", IEEE Micro, May 1982, pp. 38–49). However, these interconnection systems lack the desired and required flexibility and the control for the interconnection means.

SUMMARY OF INVENTION

It is therefore an object of the invention to provide a multicomputer network which overcomes the problems of the prior art.

It is a more specific object of the invention to provide a multicomputer network which is flexible so as to permit quick and easy rearrangement of the communication patterns between the computers.

It is an even more specific object of the invention to provide a novel interconnection system.

It is an even more specific object of the invention to provide a multicomputer network including the novel interconnection system and also including interface means for connecting the computers of the multicomputer network to the interconnection system.

It is an even more specific object of the invention to provide such interface means.

In accordance with the invention there is provided a multicomputer network. The network includes a plurality of individual computers and an interconnection system for interconnecting the computers. Interface means are provided for connecting the computers to the interconnection system.

In accordance with a different embodiment of the invention there is provided bus controller means for transmitting messages between a plurality of computers in a multicomputer network. The bus controller means includes processor means and flexible means for selecting a next computer for sending a message. It also includes means for decoding the address of the receiving computer in the message from the computer sending the message and means for transmitting the message directly from the computer sending the message to the computer receiving the message.

In accordance with a still further embodiment there is provided an interface unit for use in a multicomputer network. The network includes a plurality of computers, and a separate interface unit is associated with a separate one of the plurality of computers. The computer with which an interface is associated is referred to as its host computer. The interface unit comprises storage means for storing messages to be received and messages to be transmitted by the host computer of the interface unit. It further includes means for checking the status of the storage means, and access vector means for storing identification of other computers of the network which may communicate with the host computer, and the direction of such communication. The interface unit further includes lock means for preventing unauthorized access, by the host computer, to information contained in the interface.

BRIEF DESCRIPTION OF DRAWINGS

The invention will be better understood by an examination of the following description, together with the accompanying drawings, in which:

FIG. 1 is a somewhat schematic block diagram of the multicomputer network in accordance with the invention;

FIG. 2 is a somewhat schematic block diagram of the controller for the interconnection system;

FIG. 3 illustrates timing diagrams of the computer control of a byte transfer between two computers in the multicomputer system;

FIGS. 4a to 4c are flow charts illustrating the operation of the controller;

FIG. 5 is a somewhat schematic block diagram of the interface means;

FIG. 6 illustrates the timing details for the selection of the next sender;

FIGS. 7A and 7B illustrates different possible communication patterns between the computers; and FIG. 8 illustrates data structures used by the message communication software.

DESCRIPTION OF PREFERRED EMBODIMENTS

Figure 4A:
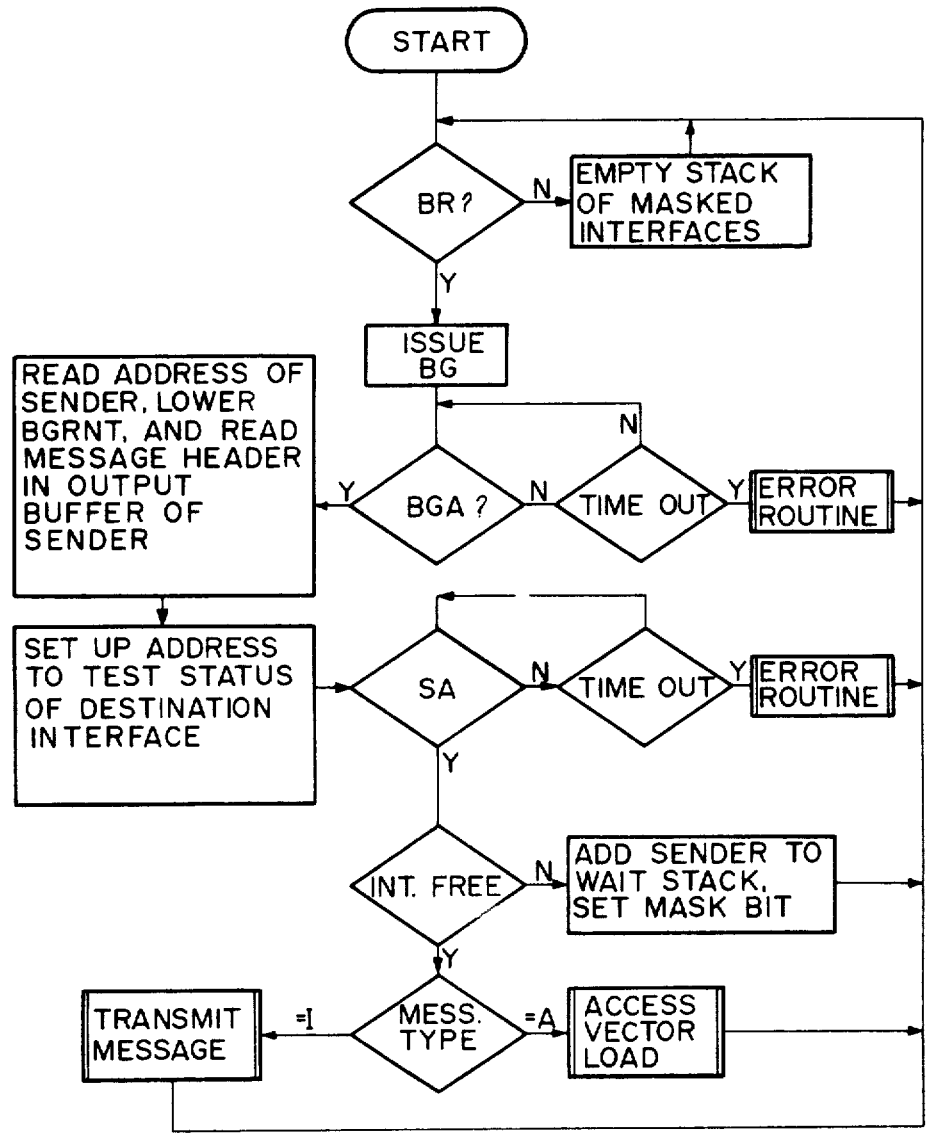

Before turning to the drawings, themselves, one should recall that one of the ways of classifying different multicomputer systems is based on the degree of coupling between computers of that system. (See for example E. T. Fathi and M. Krieger, "Multiple Microprocessor Systems: What, Why, and When", IEEE Computer, March 1983, pp. 23-34). In a tightly coupled case, all computers of a multicomputer share the same memory address space (see the Swan et al reference above-mentioned) and communicate with each other through the shared memory. On the other hand, in a loosely coupled case, as in a local area network, each computer will have its own memory address space and may exist independent of the other computers. In this case, communication between computers takes place by passing messages over an interconnection system.

Turning now to FIG. 1, a multicomputer network in accordance with the invention comprises a plurality of computers, preferably microcomputers, illustrated generally at 1. Although only two such computers are illustrated, it will of course be understood that the normal network will include more than two computers.

There are several types of functional units in the network, namely, a master computer and several slave computers. A network may also include specialized slave computers called network memory units.

The master computer provides the interface between the user and the remainder of the network. The master computer is responsible for allocation of slave computers to execute user programs, and it will also coordinate all the dynamically allocatable resources of the network. The slave computers will execute the modules of a decomposition of a user program.

The network memory units are accessible to the computers of the network as a common memory bank. For example, a network memory unit is a good candidate to store the centralized directory of a distributed data base. The centralized storage and maintenance of common data in network memory units saves memory because it avoids data duplication. The network memory unit can also save time because the number of messages transmitted over the interconnection system for the purposes of updating the common data is reduced.

Each network memory unit is controlled by a programmable microprocessor. This makes it possible to allow the network memory units to perform the function of an associated memory and synchronize updates on the shared data.

The master computer of a network is responsible for the following operations:

allocation of one or more slave computers to a user program initialization of the access vectors (explained below in association with FIG. 5) to realize the interconnection structure desired by the application program loading of the modules of a decomposition to program memories of the alotted slave of computers handling of exceptions such as program termination, access right violation, and irrecoverable error conditions, etc.

As the master computer will not contain any special hardware, any computer in the network can function as the master as long as its internal memory and CPU configuration are capable of running the master computer software. When the master fails, the distributed computing on the network is halted and it can be restarted by designating any of the remaining computers as the new master.

Each computer comprises a processor 3, a ROM 5, and a RAM 7. The computers may also be connected to peripheral elements 9 such as CRT's, mass storage devices, special purpose processors, keyboards, printers, etc.

The computers are connected to each other by an interconnection system illustrated generally at 11 and comprising a bus 13 and a bus controller 15. The bus is preferably a time shared, high speed parallel bus, and the bus controller is more fully described in association with FIG. 2 below.

Connected between the interconnection system and each computer is an interface unit 17 which will be more fully described in association with FIG. 5 below. As can be seen in FIG. 1, each interface unit is connected to a respective computer. The computer to which an interface unit is connected is referred to as the host computer of the interface unit. Thus, each interface unit is connected to a respective host computer, and each computer is host to a respective interface unit. Each interface unit includes access vectors relating to the host computers. The access vectors define with which computers a host computer can communicate, and the direction of such permitted communications.

As will be appreciated, the master computer will have a terminal to permit communication of the user with the master computer. A user decomposes his program into a plurality of modules, and usually enters these modules through the master computer. The user also specifies to the master computer his desired interconnection patterns for executing different modules.

As can be seen, the bus includes data lines 19, send address lines 21 (the lines for carrying the address of a message sender), receive address lines 23 (the lines for carrying the address of the receiving computer for a message), and control lines 25 for carrying control signals. The control lines help the controller select a next sender and determine if an error has taken place. They are also lines which are used for handshaking. This will be more fully discussed below.

Turning now to FIG. 2, it is first to be noted that the interconnection system of a distributed computing network should be reasonably "fast" in order to support the message traffic that will be generated by the different modules of a decomposition. On the other hand, when the interconnection facility is intended as an experimental research tool, it should be as flexible as possible. The interconnection system herein has been developed taking into account these two conflicting factors of flexibility and speed.

The interconnection system is an intelligent communication sub system which directs the transmission messages between computers. This central control method makes it possible to consolidate the complexity of the hardware required for bus arbitration and the control of the interconnection system into a single unit. Such an approach has the advantage of reducing the complexity of the hardware and software required at each local station, i.e., at each computer. However, a certain amount of reliability is sacrificed in this way. When reliability is of great concern, it is possible to use a plurality of interconnection systems.

As seen in FIG. 2, the controller of the interconnection system comprises a processor 27, a ROM 29 and a RAM 31. In a specific embodiment, the processor is an MC - 6809, and the ROM and RAM are both 2K.

The asynchronous communication interface adaptor 33 comprises a useful addition for system development and monitoring. The output of 33 is connected to a control console 35, and the adaptor 31 converts the data, loaded into it in a parallel manner, into a serial stream. When performing system diagnosis for the operating system verification, a dump of exactly what the bus controller is doing at all times is desirable. This will be produced at the control console so that there is a visual record of what exists in the bus controller at all times. With 33 and 35, the speed of the system is decreased because it is in a debug mode. Accordingly, a final production model of the system will probably not include the elements 33 and 35.

Attached to the computer is additional hardware 30 which includes receive address latch 39 and receive address counter 41. It also includes a send address latch 43 and a send address counter 45.

The additional hardware also includes a real-time clock 37 which is used by the controller for time stamping each message transmitted. Such a time stamps is useful for certain error recovery procedures and distributed processing applications.

Concerning the latch and counter arrangement for the receive and send address, the most significant address bits of both the send and receive address will not change for each input and output buffer of the interface unit which will be described below. Accordingly, the most significant bits are latched in the receive address latch and the send address latch respectively. The receive and send address counters are also latches which have the additional function that they can be incremented. Accordingly, the counters will be incremented for the purpose of providing the least significant bits of changing receive and send addresses.

The additional hardware also includes a control register 47 and a status register 49. The controller 27 senses the status of the control lines via the status register and drives certain of the control lines through the control register. Details of the register's contents are given in Table I below:

Table I

Status Register Contents
(a) Slave Acknowledge
(b) Bus Grant Acknowledge
(c) Bus Request
(d) Parity Indicator
(e) Master Address
Control Register Contents
(a) Reset Bus Grant
(b) Issue Bus Grant
(c) Reset Parity Indicator
(d) Perform Data Byte Transfer Between Two Interfaces
(e) Read Data Byte From an Interface
(f) Write a Data Byte into an Interface The additional hardware further includes a control timing generator 51. This basically comprises a series of one-shot stable multivibrators arranged in a proper configuration to give correct delays to control the correctly timed transmission of data. The timing of the transfer of a data byte of a message from a sender to a receiver is illustrated in FIG. 3 herein. As can be seen, the data byte is transferred when clock (CLK) is asserted. At the falling edge of the parity signal PCK, the parity of the received byte is verified to ensure the correctness of the transmission.

The additional hardware is connected to the bus lines via either line drivers 53 with termination or a line transceiver 55 with termination.

The controller functions are summarized as flowcharts in FIGS. 4a, 4b and 4c. FIG. 4a illustrates how a next sender is selected. FIG. 4b illustrates how a message is transmitted including a parity check, and FIG. 4c illustrates access vector loading which will be more fully discussed below.

Turning now to FIG. 5 of the drawings, the interface unit comprises a daisy chain logic 57 and a mask controller 59. In this regard, daisy chain arbitration logic is used by the bus controller to select the next sender. The daisy chain works essentially as follows. Assume several elements wish to share a resource. When that resource is requested by one of the elements, the request is received on a common request line so that the controller, which controls the resource, does not know which element is requesting the resource upon receipt of the request. Accordingly, the controller will pass the resource to his closest neighbor on the line, i.e., the computer which is first in the daisy chain line. If the neighbor has not requested the resource, he (the neighbor) will pass it to the next computer, and so forth until the computer which has requested the resource receives it. The order of priority is the order of sequence in this chain. Computers closest to the front of the chain will get the grant first.

When the element or computer which has requested the resource receives it, it will send an acknowledgement to the controller and, at the same time, identify itself.

The mask controller is set by the bus controller 27 of the interconnection system to alter the daisy chain logic 57 of a particular interface unit so that, when the mask controller of an interface is set, that interface will bypass all grants regardless of whether or not it has requested the resource. This is to ensure that computers at the front end of the chain do not continually occupy the attention of a controller.

The interface also includes an address switch comprising switches 61, send address decode 63 and receive address decode 65. The address switch determines the base address of the interface. By means of the switches 61 an interface can be placed in different segments of the address space of the interconnection system. The send address and receive address decode units will decode the send and receive addresses and give proper signals to the input buffer, output buffer or access vectors (to be discussed below) when they are enabled.

The interface also includes a status register 67 and a control register 69. The status register will check the status of the input and output buffers. The control register will set the mode of this checking. Thus, the registers can be checked either in an interrupt mode or a poll mode. In the interrupt mode, when the status of either the input or output buffers changes, an interrupt signal is generated and sent to the computer advising the computer of the new status of the appropriate buffer. In a poll mode, the status of the buffers are checked at preselected intervals. The control register determines which of the modes will be used for checking the status.

Input buffer 71 and output buffer 75 are buffers for storing data on its way into or out of, respectively, the computer. Data is stored in the input buffer until the host computer removes it. Data leaving the computer is stored in the output buffer until the controller of the interconnection system is ready to transfer it to the input buffer of a different computer.

Parity check 73 and parity generator 75 are to provide error checks of incoming and outgoing data. The parity check 73 checks the parity of incoming data. It includes within its hardware means for counting the bits and means for determining whether the bits display the proper parity.

In a like manner, the parity generator counts the outgoing bits and provides a parity bit.

The access vector contains information relating to permissible communication patterns of the host computer. Specifically, it contains the identification of computers which can communicate with the host computer and identification of computers with which the host computer can communicate. It also includes the direction of such permitted communications.

It is noted that the access vector can be read by the host computer. However, the host computer cannot modify the access vector. Only the master computer can modify the access vector of the slave computers.

Each interface also includes a lock arrangement which includes a key register 81, a lock register 83, a comparator 85 and an address switch 87 and a host address decode logic 89. In order to "unlock" register 81. This code is compared with a "hard wired" (or preset) code in the lock register 83 in the comparator 85. If the comparison is correct, then an appropriate signal is sent to the host address decode 89 which unlocks the interface.

When a message is to be transmitted, the access vector will then be checked to determine whether the proposed communication path is permitted and, if it is, then the access is allowed.

The address switch 87 is provided to set the address in the host address decode.

The interface also includes a plurality of tri-state buffers 91.

The timing details of the selection of the next sender are shown in FIG. 6. When the interconnection system asserts the bus request (BR) line, the controller of the interconnection system will respond by asserting the BG (bus grant) signal. After a maximum delay of fifteen micro-seconds, the controller of the interconnection system will sense the BGA signal from the interface that has been designated as the next sender by the daisy chain. At this point, the address of the next sender is read by the controller of the interconnection system from the data lines. The controller of the interconnection system will then obtain the address of the intended receiver from the message header in the out box of the current sender. When SA (slave acknowledge) is asserted by the prospective receiver and CLK and VSA (valid slave acknowledge) are asserted by the controller, the status of the receiver input buffer will be checked.

In the interface, the storage elements such as the input buffer, output buffer, access vector, lock and key registers and status and control registers, are all placed in the address space of the host computer associated with that interface unit.

In the multicomputer network as abovedescribed, every computer is physically connected to every other computer. However, it is possible program requires a specific communication pattern. For example, two communication patterns are illustrated in FIGS. 7a and 7b. In order to support the constrained access as illustrated in FIG. 7, or in other types of patterns, it is only necessary to adjust the access vectors of the appropriate computers. Accordingly, the network herein provides a great deal of flexibility for providing different communication patterns.

Each computer of the network will have a unique address referred to as its physical processor number or PPN. One of the PPN's will be designated as the master computer and the controller of the interconnection system will be aware of this designation. The master computer will place in the access vector of each interface the PPNs of all other computers with which communication over the interconnection system will be permitted, and the direction of such permitted communications. As mentioned, although each computer can read the access vector of its interface unit, it cannot modify the access vectors. The access vectors can be modified only by the master computer.

As above-mentioned, the access vector exists in the memory space of the host computer. It therefore becomes obvious that each computer in the network will require a facility to protect a part of its memory against unintended access. Not all microcomputers are so equipped. Application programs will be required to send messages only by making a supervisor call to the operating system which will check with the access vector to ensure the integrity of the interconnection topology. However, a program crash could send a "stray" message to another computer and thereby violate the permitted topology constraints. In order to avoid this problem, the lock and key registers are provided in each interface unit. By making use of these registers the system software can lock the interface against access by a crashed user program.

In operation, a message is communicated between computers of the network as follows:

As above-mentioned, it is possible to use multiple interconnection systems. When multiple interconnection systems are used, a message can be divided into several packets and transmitted via different intercommunication systems.

In any case, a message, or a message packet, is variable in length and, in an actual embodiment of the invention, it can be up to 256 bytes. Each message or message packet consists of three logical sections, namely, the header, the body and the trailer. The trailer contains a check sum and the message header contains the following information:
   sender address
   receiver address
   message type
   packet identification
   time stamp.

Messages are carried, by the intercommunication system, directly from the out buffer of the send interface unit to the in buffer of the receive interface unit. The message does not go through the controller of the interconnection system, but is transferred directly from buffer to buffer.

After the entire message is transferred from the out buffer of the sender to the in buffer of the receiver, the controller of the interconnection system updates the status register of both the sender and receiver interface units. If the interface units are set to the interrupt mode, an interrupt signal is generated at the receiver computer to inform the host computer of the arrival of the new message, and an interrupt is raised at the sender computer to indicate that the output buffer is empty. The message communication software, present in every computer of the network, is driven by these interrupts. Data structures used by the message communication software are shown in FIG. 8 herein.

As soon as is possible, the interrupt handler transfers an incoming message from the IN buffer to the "receive queue" and releases the IN buffer which is now free to receive other messages. Similarly, upon finding its own OUT buffer to be free, the interrupt service routine transfers a message from the front of the "send queue" and updates the interface output status latch. This will cause the interface to assert the bus request signal. At the same time, a copy of the sent message is saved in the "back log" file. At an appropriate time, messages in the receive queue are decoded and interpreted as an operating system command or stored in the decoded message buffer future use by an application program.

When decoding a message, the message communication software verifies the correct transmission of a message by computing a check sum and comparing it with the check sum in the message trailer. If a check sum error is encountered, a special message is transmitted to the originator of the message requesting a retransmission. As stated earlier, each computer keeps a backlog of the last "k" messages transmitted which is used to respond to the retransmission requests.

As received messages are decoded, a logic of received and yet unconsumed messages is created and maintained by the message communication software. Upon request by an application program this log is checked to determine if a specific message upon which it is waiting has arrived.

The programming environment for the network consists of four major tools.

(a) An operating system resident on the master computer through which users communicate with the network for problem solving. The major function of this software has been previously itemized.

(b) Extensions to a programming language that enable a user to transmit messages from one module to another. Such messages would be used for transmitting both data and control information between modules.

(c) Message communication software that resides on the master and slave computers and performs functions such as framing a message, sending and receiving messages, and interrupt handling.

(d) A run time support system that is distributed over the computers of the network. It is responsible for monitoring and reporting to the user the message flow that is created on the interconnection system by his program, recognition of inactive slave computers, run-time control of the slave computers allotted to a user program, and for interactive debugging.

Extensions to a programming language include two pre-defined statement types:

SEND <destination computer><message type><message>—this sends a message from the computer on which the SEND is executed to the destination computer. The message type is one of the pre-defined types and it is used by the message communication software to interpret the message.

WAIT-UNTIL <from-computer><condition-expected>. When this statement is executed within a module that module enters a wait state and remains there until the <condition-expected> becomes TRUE which is usually on account of a message received from the <from-computer>.

The message communication software will be part of both the master and slave computer operating system. All the software will follow the layered approach set out by the International Standards Organization (ISO). The lowest layer, called the physical layer, is completely determined by hardware. At level two, or data link layer, both a combination of hardware and software is used. A parity check, performed by the hardware, and the interrupt handler, responsible for servicing the IN and OUT buffer of each interface, are the major components of the data link layer. The decoding of an incoming message, request for retransmission based upon checksum verification, and verification of the access privileges of a slave by consulting its access vector are the responsibilities of the network layer. The fourth layer, or transport layer, provides an interface between the operating system, or applications program, and the communication subnet. At this level application programs, or the operating system, will make requests to the message communication software to transmit a message, or check the message log for the arrival of a specific message. The session, presentation, and application layer facilities are provided by the distributed operating system of the network and our extended programming language.

It has been assumed that the different modules of a decomposition are readily present in the allocated computers of a user job and they are ready for execution. It is the responsibility of the network run-time support package to load such modules into the appropriate slaves. A module or program segment may be transmitted by the master to a slave as a special type of message. Or a command type message may be sent to the slave requesting it to load a module which is stored on one of its mass storage devices. This problem of loading programs into slaves is somewhat simplified if all the computers of the network can "understand" a common programming language that is used by an application programmer.

When presenting the results of the execution of a program to its user, the network master computer will also present statistics concerned with the message flow that occurred between the various modules of his decomposition. By examining such statistics a user will be able to improve upon his decomposition particularly in the case of a production program that will be run over and over again.

It can be seen from the above that the invention has provided a multicomputer network which is flexible in easily and quickly rearranging communication patterns as between computers, and which has safety measures to prevent unauthorized accesses. In addition, there is provided a novel interconnection system for the multicomputer network, and an interface means for each of the computers which interfaces between the interconnection system and the host computer.

Although a particular embodiment has been described, this was for the purpose of illustrating, but not limiting, the invention. Various modifications which will come readily to the mind of one skilled in the art are within the scope of the invention as defined in the appended claims.

We claim:

1. A multicomputer network, comprising a plurality of individual computers where communication patterns between said plurality of individual computers can be altered, for carrying out distributed computing, said distributed computing further comprises decomposing a program into a plurality of different modules that can be concurrently executed by said plurality of computers; said multicomputer network comprising:

said plurality of individual computers each having a unique address in the network;

an interconnection system for interconnecting said computers to allow different communication patterns;

interface means for connecting said computers to said interconnection system; and a centralized bus controller for controlling the transmission of messages among said plurality of individual computers in a predetermined sequence and directly from a transmitting computer to a receiving computer;

said bus controller is the sole controller of said interconnection system at all times;

wherein said bus controller comprises:

(A) means for selecting a next computer in said sequence for sending a message;

(B) means for changing said sequence;

(C) means for decoding the address of the receiving computer in said message from said transmitting computer sending said message;

(D) control timing generator means for providing all control signals of said inerconnection system required to effect a message transfer from said transmitting computer to said receiving computer;

(E) a synchronous commmunication interface means for the display of bus status information to an operator to allow for system monitoring;

(F) real time clock means for time stamping each message to aid in error recovery procedures in distributed computing;

(G) processor means for determining the sequence in which means (A) to (F) of the bus controller will be used in the process of controlling the transmission of messages between said plurality of computers;

said interface means comprising a plurality of interface units equal in number to said plurality of said computers;

a separate interface unit being connected to respective separate one of said plurality of computers, the respective computer to which an interface unit is connected being its host computer;

each said interface unit comprising:

storage means for storing messages to be received and meassages to be transmitted by the host computer of the interface unit, said storage means having a status of either empty or full;

means for checking the status of the storage means;

access vector means containing addresses of computers which can communicate with the host computer of the interface unit and addresses of computers with which the host computer of the interface unit can communicate, and the directions of such permitted communications;

where, the access vectors of all the computers of the network together define, and/or redefine, said communication pattern among the computers of the network in order to support different decompositions in distributed computing;

lock means for preventing unauthorized access, by application programs running on the host computer of said interface unit, to said interconnection system;

control register means for setting the mode of the means for checking the status of the storage means;

wherein said interconnection system comprises a network bus, each said individual computers comprise an interval system bus, and said processor means of said bus controller comprises a controller system bus.

2. A network as defined in claim 1 wherein:

each said interface unit comprises an input buffer and an output buffer;

wherein messages transmitted from one computer to another in the network are transmitted directly from the output buffer of the sending computer to the input buffer of the receiving computer.

3. A network as defined in claim 2 wherein;

both said input buffer and said output buffer are connected, on one side thereof, to said network bus; and both said input buffer and said output buffer are connected, on the other side, to the system bus of the host computer of said interface unit.

4. A network as defined in claim 3 wherein said means for checking the status comprises a status register;

said status register being connected, on one side thereof, to said network bus;

said status register being connected, on the other side thereof, to the system bus of the host computer of said interface unit.

5. A network as defined in claim 1 wherein;

said lock means for preventing unauthorized access comprises;

a comparator having two input terminals;

a key register having an output terminal connected to one of the input terminals of said comparator;

a lock register having an output connected to the other input terminal of said comparator;

said key register being connected to the internal system bus of the host computer of said interface unit.

6. A network as defined in claim 5 wherein said lock means comprises:

said key register for receiving a code from any appli-cation program running on the host computer;

said lock register for storing a predetermined combination code;

said comparator for comparing the code contained in the key register with the code contained in the lock register;

whereby, when said comparator finds the code contained in the key register to match with the code contained in the lock register, said lock means will permit an application program to use components of said interface unit for accessing said interconnection system.

7. A network as defined in claim 1 wherein one of said computers comprises a master computer; and only said master computer modifying the access vectors of the remaining computers of the network to redefine the permissible pattern of communication among said plurality of computers;

thus, the topology of said interconnection system is changeable to suit different decompositions required for distributed computing.

8. A network as defined in claim 1 wherein said computers are arranged in a daisy chain arrangement;

each said interface means comprising daisy chain logic means and a mask register for masking said daisy chain logic means;

wherein said mask register is set by said bus controller to change said sequence;

said mask register is connected to said daisy chain logic means;

said mask register and said daisy chain logic means are connected to said network bus.

9. A network as defined in claim 1 wherein said means for selecting a next computer comprises a send address latch and a send address counter;

said send address latch and said send address counter are connected, on one side thereof, to said network bus; and said send address latch and said send address counter being connected, on the other side thereof, to said controller system bus.

10. A network as defined in claim 9 wherein said means for decoding comprises a receive address latch and a receive address counter.

11. A network as defined in claim 1 wherein said interface unit further includes error handling means for ensuring correct delivery of messages from a sending computer to a receiving computer;

said error handling means comprising a parity generator and a parity checker;

said parity generator being connected to said network bus and to said output buffer;

said parity checker being connected to said network bus and to said input buffer.

12. A network as defined in claim 1 wherein said access vector means is connected to said network bus on one side; and wherein said access vector means is connected, on the other side, to the internal system bus of the host computer of its interface unit.

13. A network as defined in claim 1 wherein said control register is connected to said interval system bus.

* * * * *